United States Patent Office 3,634,419
Patented Jan. 11, 1972

3,634,419
17-AZASTEROIDS
Norman A. Nelson, Galesburg, and Robert W. Jackson, Portage, Mich., assignors to The Upjohn Company, Kalamazoo, Mich.
No Drawing. Filed July 28, 1969, Ser. No. 845,566
Int. Cl. C07d 27/30
U.S. Cl. 260—244 R        18 Claims

ABSTRACT OF THE DISCLOSURE

This invention relates to novel 17-azasteroids, to processes for their preparation and more particularly to compounds embraced by the following formula:

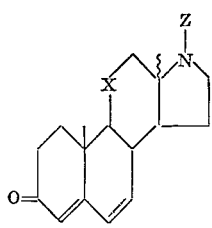

V wherein Z is hydrogen, alkyl, —$SO_2R$, in which R is alkyl or aryl, —$COR_1$, in which $R_1$ is alkyl, and —$COOR_1$ in which $R_1$ is alkyl, and X is carbonyl (>C=O), α-hydroxymethylene

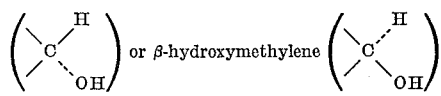 or β-hydroxymethylene and the pharmacologically acceptable acid addition salts of those compounds of Formula V, above, wherein Z is hydrogen or alkyl. The compounds of the above Formula V are anti-inflammatory agents; central nervous system stimulants, and antifungal and antimicrobial agents.

SUMMARY OF THE INVENTION

The novel 17-azasteroids of this invention and the processes for their production are illustratively represented by the following sequences of formulae:

Sequence A

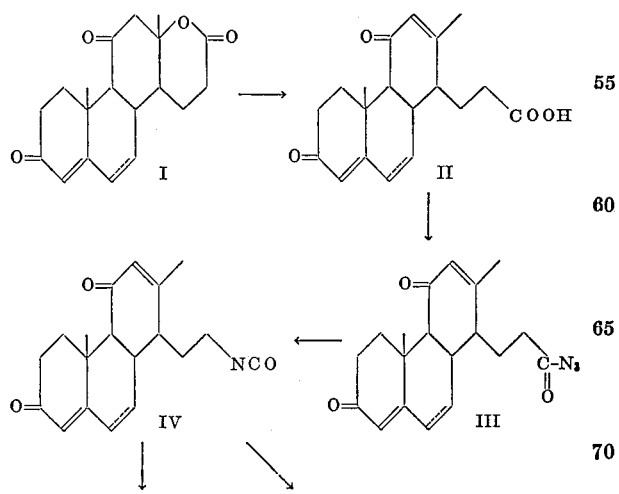

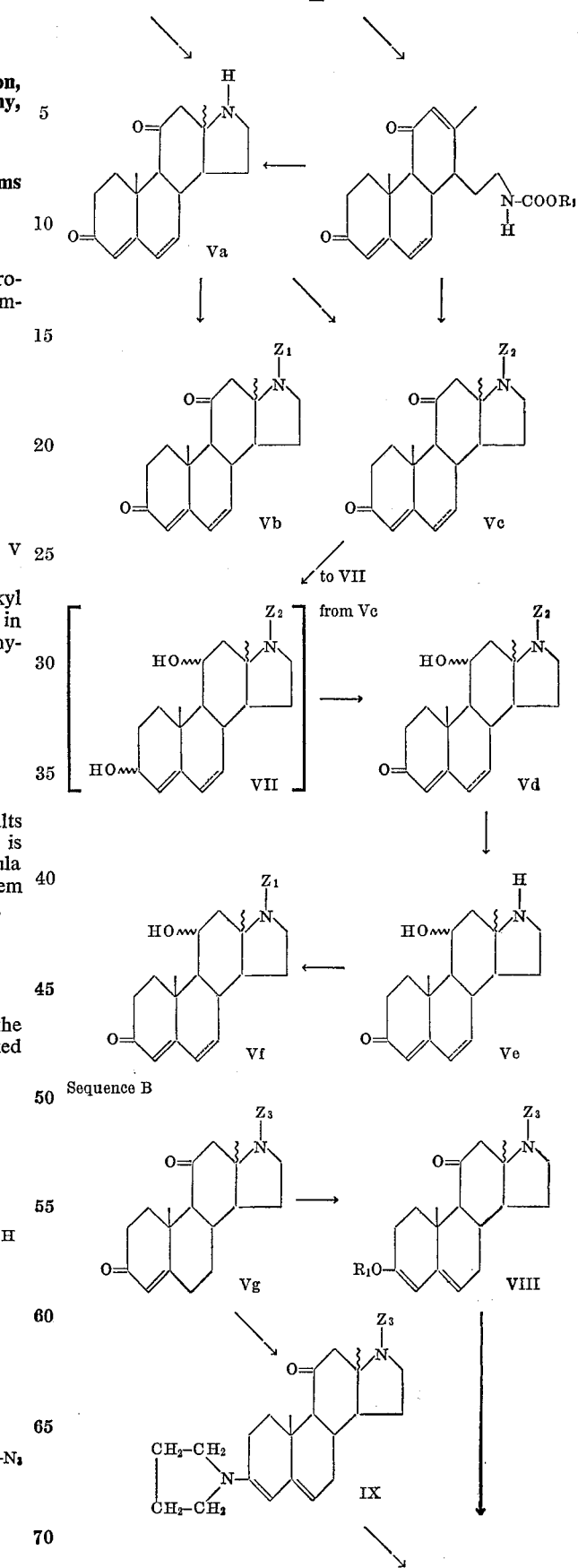

3

Sequence C

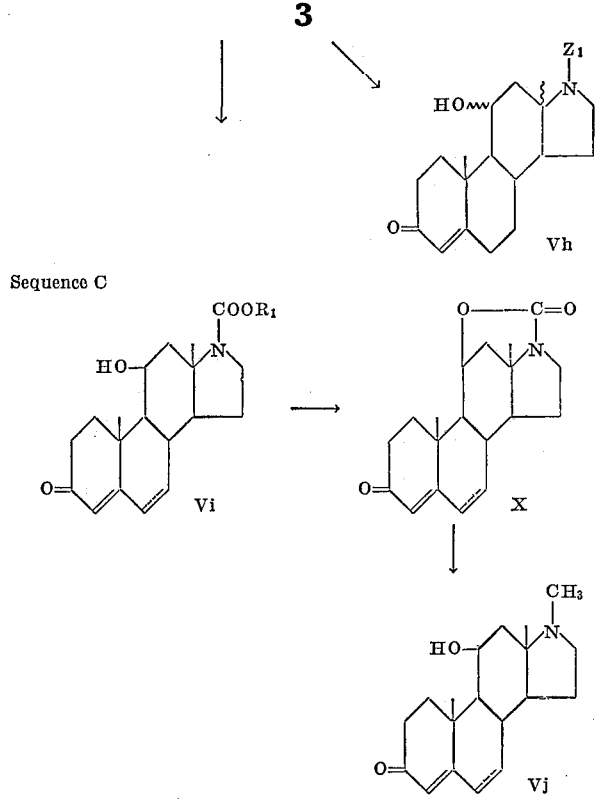

wherein $R_1$ is alkyl; $Z_1$ is alkyl; Z is $-SO_2R$, $-COR_1$ or $-COOR_1$, in which R is alkyl or aryl, and $R_1$ is alkyl; and $Z_3$ is $-COR_1$ or $-COOR_1$, in which $R_1$ is alkyl.

In this application the term "alkyl" means an alkyl radical of 1 to 8 carbon atoms inclusive such as methyl, ethyl, propyl, butyl, hexyl, heptyl, octyl and isomeric forms thereof. The term "aryl" means an aryl radical of 6 to 12 carbon atoms, inclusive, such as, phenyl, tolyl, xylyl, naphthyl, diphenyl, halophenyl, nitrophenyl and the like. The wavy lines ($\backsim$) appearing in the structural formulae indicate the α (alpha) configuration, the β (beta) configuration and mixtures thereof. The broken line appearing between the 6- and 7-carbon atoms in the structural formulae indicates the presence of a single bond linkage or a double bond linkage.

Formula V, above, is a combination of compounds of Formulae Va through Vj which are prepared in accordance with reaction sequences A, B and C, above. The compounds of Formula V and the acid addition salts thereof wherein Z is hydrogen or alkyl are active anti-inflammatory agents, central nervous system stimulants, and are antifungal and antimicrobial agents.

As anti-inflammatory agents, the novel compounds of this invention can be used in dosages of 0.5–20 mg./kg. in the treatment of gouty arthritis, rheumatoid arthritis, rheumatoid spondylitis, osetoarthritis, psoriatic arthritis, acute superficial thrombophlebitis and painful shoulder syndromes such as peritendinitis, capsulitis, bursitis, and acute shoulder arthritis as well as contact dermatitis, atopic dermatitis, neurodermatitis, anogenital pruritus, seborrheic dermatitis, and the like, and for the relief of pain and fever. They also find application in the local treatment of inflammatory conditions in animal mastitis, a disease of the mammary glands which can be of particular concern in milk-producing animals such as cows.

As central nervous system agents, the compounds of this invention are useful for modulating the temperament of animals. They can be administered to animals at dosages of about 1 mg./kg. to 10 mg./kg. of body weight to produce beneficial responses to environmental stimuli and modulation of temperament.

Suitable solid dosage forms include tablets, pills, capsules, granules, powders, suppositories, and the like. Advantageously, the pharmaceutical carriers for such solid forms include corn starch, lactose, dicalcium phosphate, terra alba (calcium sulfate), talc, stearic acid, magnesium strearate, and gums. Suitable fluid dosage forms include solutions, suspensions, syrups, and emulsion. Advantageously, the pharmaceutical carrier for such fluid forms comprise water, oils, and water-oil emulsions. If desired, suitable dispersing or suspending agents can be included, for example, tragacanth, acacia, alginates, dextran, methylcellulose, polyvinylpyrrolidone, gelatin, and mixtures thereof. Suitable oils for solutions and water-oil emulsions include cottonseed oil, sesame oil, coconut oil, and peanut oil.

DETAILED DESCRIPTION OF THE INVENTION

The starting materials for the process of this invention, represented by Formula I, above, can be prepared from 11α-hydroxytestololactone, in accordance with Preparations 1–3, herein.

Reaction Sequence A.—In carrying out the process of reaction sequence A of this invention to obtain the compounds of Formula V, the selected 11-ketotestololactone of Formula I is treated with an alkanolic alkali metal alkoxide; such as methanolic sodium methoxide, ethanolic potassium ethoxide and the like, followed by acidification with an aqueous acid such as hydrochloric, sulfuric, acetic and the like, to obtain the corresponding 3,11-dioxo-13, 17-secoandrosta-4,12-dien-17-oic acid of Formula II, the reaction is carried out within a temperature range from about 0° C. to about 50° C., a temperature within the range of about 20° C. to about 35° C. or about room temperature, is convenient and advantageous. If desired the reaction can be carried out in the presence of a cosolvent such as methylene chloride.

The carboxylic acid (II) thus obtained, is then converted to the corresponding acid chloride by reaction with oxalyl chloride or thionyl chloride in an inert organic solvent such as benzene, toluene, tetrahydrofuran, dioxane and the like, to obtain the corresponding acid chloride, or alternatively the acid chloride can be prepared by reacting an alkali metal salt of the carboxylic acid (II) with oxalyl chloride. The acid chloride is then treated with sodium azide to obtain the corresponding acid azide (III).

Alternatively, the acid azide (III) is obtained without isolation of intermediates in accordance with the method of J. Weinstock, J. Org. Chem., 26, 3511 (1961); the selected carboxylic acid (II) is treated with an equivalent amount of a trialkyl amine such as triethylamine and an alkyl chloroformate, such as methyl chloroformate, ethyl chloroformate, isobutyl chloroformate and the like, in an aqueous organic solvent such as acetone, to give a mixture of carboxylic-carbonic anhydrides which are then reacted with sodium azide to give the acid azides of Formula III.

The acid azide (III) is then subjected to a standard Curtius rearrangement [P.A.S. Smith, Org. Reactions, III, 337 (1946)] which involves heating the acid azide in a dry inert solvent such as benzene, toluene, tetrahydrofuran, dioxan and the like, to obtain the corresponding isocyanate (IV).

The isocyanate (IV) thus obtained, is then hydrolyzed under acidic conditions to obtain the corresponding amine salt which is subjected to a Michael addition reaction under basic conditions to effect ring closure at the 17-position. Hydrolysis of the isocyanate is carried out under aqueous conditions using an aqueous organic acid such as trifluoroacetic acid, trichloroacetic acid, acetic acid, oxalic acid, citric acid, and the like or with a dilute mineral acid such as hydrochloric, sulfuric, phosphoric and the like. When acetic acid is used, the presence of a small amount of a mineral acid is desirable in order to suppress formation or the acetamide derivative. The hydrolysis can be carried out within a wide temperature range such as from about 0° C. to about 80° C., however, a temperature within the range of from about 20° C. to about 70° C. are advantageous. The amine thus obtained is then subjected to ring closure in the presence of a base. Ring closure is effected under a wide range of conditions and with a wide variety of bases. Illustrative of bases which can be used are alkali metal alkoxides such as potassium tert.-butoxide, sodium methoxide, lithium ethoxide, and the like; sodium or potassium hydroxide in alcohols or aqueous alcohols; quarternary ammonium hydroxide; alkali earth hydroxides such as barium or calcium hydroxide, and the like. The reaction is advantageously conducted in an organic solvent such as alcohol, e.g., methanol, ethanol, propanol, isopropanol, butanol, tert.-butanol and the like; tetrahydrofuran, dioxane or other suitable solvent. The ring closure can be carried out within a broad temperature range such as from about −10° C. to the boiling point of the reaction mixture. Temperatures within the range of from about 0° C. to about 30° C. are advantageous. The compounds of Formula Va thus obtained, can be recovered from the reaction mixture and purified in accordance with conventional methods such as chromatography and/or crystallization from a suitable solvent.

The compounds of Formula Va are converted to the corresponding 17-alkyl compounds Formula Vb by reacting the selected compound Va with an alkylating agent in an inert solvent such as ether, tetrahydrofuran, dioxane, benzene, toluene, alkanols, e.g. methanol, ethanol, isopropanol, t. butanol, and the like. Alkylating agents which can be used are alkyl halides of the formula $R_1X$ wherein $R_1$ is alkyl and X is chlorine, bromine or iodine, alkyl tosylates, alkyl organic sulfonates and the like, for example, methyl iodide, ethyl bromide, propyl iodide, butyl bromide, N-propyl-p-toluenesulfonate, butyl methanesulfonate, etc. The compounds of Formula Vb are recovered and purified by conventional methods.

The compounds of Formula Va are converted to the corresponding compound of Formula Vc by reacting the selected compound Va, in an inert organic solvent such as methylene chloride, ether, tetrahydrofuran, benzene, toluene, chloroform and the like, with an excess of an acid halide or anhydride in the presence of an aqueous base such as ammonium hydroxide, sodium hydroxide, pyridine and the like. Acid halides and anhydrides which can be employed are, for example, aryl and alkyl sulfonyl halides of the formula $RSO_2X$, wherein R is alkyl or aryl as hereinbefore defined and X is chlorine, bromine or iodine; acid halides of the formula $R_1COX$ and alkyl orthohaloformates of the formula $R_1OOCX$, in which $R_1$ is alkyl as hereinbefore defined and X is halogen as defined above. The reactions are preferably carried out at a temperature within the range of from about 0° C. to about 30° C. while maintaining the pH of the reaction mixture at about 9–12. The compounds of Formula Vc thus obtained, are recovered and purified by conventional methods.

Alternatively, the compounds of Formula Va are prepared by treating the isocyanate (IV) with an excess of an alkanol of the formula $R_1OH$, in which $R_1$ is alkyl as defined, above, with or without a cosolvent such as ether, methylene chloride, benzene and the like to obtain the corresponding urethan (VI) which is saponified in accordance with known methods, for example with an alkali metal hydroxide in an aqueous organic solvent; e.g., aqueous methanolic potassium hydroxide, which concommitantly effects ring closure to give the corresponding compound of Formula Va.

Alternatively, the compounds of Formula Vc, wherein $Z_2$ is —$COOR_1$, in which $R_1$ is alkyl as hereinbefore defined, are prepared from the corresponding urethan VI, the selected urethan in an inert solvent such as an alkanol, tetrahydrofuran, dioxane, toluene, benzene, and the like is heated with a catalytic amount of an alkali metal alkoxide to effect ring closure to obtain the corresponding compounds of Formula Vc.

The 11-hydroxy compounds of this invention are prepared by reduction of the 11-keto substituents of the compounds of Formula Vc in accordance with procedure known in the art, for example, using an alkali metal borohydride such as sodium or potassium borohydride to obtain the corresponding 3,11-dihydroxy compounds of Formula VIII, followed by selective oxidation of the 3-hydroxy substituent with excess activated manganese dioxide to obtain the isomeric 11-hydroxy compounds of Formula Vd, which can be separated by chromatography. The compounds of Formula Vd thus obtained are then hydrolyzed by known methods, for example, with an aqueous methanolic alkali metal hydroxide solution to obtain the corresponding amines of Formula Ve. The compounds of Formula Ve are then subjected to an alkylating agent, in the same manner as hereinbefore described for the preparation of the compounds of Formula Vb, to obtain the compounds of Formula Vf.

Reaction Sequence B.—Alternatively, the compounds of Formula V of this invention, wherein the dotted line between the 6- and 7-positions of the structural formula, is a single bond, X is 11α- or 11β-hydroxymethylene and Z is alkyl (represented by Formula Vh) are prepared from the compounds o Formula Vg by protecting the 3-keto substituent by the formation of a 3-alkyl enol ether or a 3 enamine in accordance with procedures well known in the art. Enol ethers are prepared for example in accordance with Nussbaum et al., J. Org. Chem. 26, 3925 (1961), for example, a mixture of the selected compound Vg, 2,2-dimethyoxypropane and p-toluenesulfonic acid is heated in dimethylformamide containing a small amount of methanol to give the corresponding 3-methyl enol ether (VIII). Enamines are prepared using standard conditions for forming steroidal 3-enamines [J. Amer. Soc., 75, 1918 (1953); 78, 430 (1956); and U.S. Patent 3,070,612], for example, a compound of Formula Vg is treated with a secondary cyclic amine, pyrrolidine is preferred to give the corresponding 3-enamine IX.

The 3-enol ether (VIII) or 3-enamine (IX) is then treated with lithium aluminum hydride in a suitable organic solvent such as tetrahydrofuran, benzene, ether, mixtures thereof and the like. The reduction is preferably conducted at reflux temperature for a period of from 5 to 20 hours or until the reaction is complete. Following the reduction step the protecting group at the 3-position is removed in accordance with methods well known in the art for removing 3-enol ethers and 3-enamines for example by acid hydrolysis in accordance with the procedures disclosed in the references cited in the immediately preceding paragraph to give the corresponding compounds of Formula Vh which are recovered and purified by conventional methods.

Reaction Sequence C.—Alternatively the compounds of Formula V, wherein X is β-hydroxymethylene and Z is methyl (represented by Formula Vj) are prepared from the compounds of Formula VI. The selected compound or Formula VI in the appropriate alcohol is heated at 50° C. to 100° C. for about 5 to 20 hours in the presence of the corresponding potassium or sodium alkoxide to obtain the corresponding cyclic urethan (X). The cyclic urethan thus obtained is then protected at the 3-position by the formation of a 3-alkyl enol ether or 3-enamine in accordance with procedures hereintofore described; or by the formation of a 3-alkylene ketal by reaction with an alkane-1,2-diol or alkane-1,3-diol, ethylene glycol is preferred, in the presence of an acid catalyst, such as p-toluenesulfonic acid, in accordance with methods well known in the art. The cyclic urethan which has been protected at the 3-position is then subjected to lithium aluminum hydride reduction followed by acid hydrolysis of the 3-protective group to give the corresponding compound of Formula Vj which is recovered and purified by conventional methods.

The compounds of Formula V, wherein Z is hydrogen or alkyl can be converted to pharmacologically acceptable acid addition salts in the usual manner, that is, by directly reacting the selected acid with the free amine, preferably in an aqueous or anhydrous solvent, such as ether, methanol, ethanol, ethyl acetate, and the like. Evaporation of the solvent provides the desired acid addition salt. Useful salts thus prepared include the hydrochlorides, hydrobromides, hydroiodides, sulfates, phosphates, acetates, lactates, tartrates, cyclohexanesulfamates, pamoates, citrates, benzensulfonates, methanesulfonates, and the like.

The following preparations and examples illustrate the best mode contemplated by the inventors for carrying out their invention, but are not to be construed as limiting the scope thereof.

PREPARATION 1

11-oxotestololactone (I)

To a solution of 64 g. of 11β-hydroxytestololactone in 640 ml. of methylene chloride and 640 ml. of acetone at 5° is added 52 ml. of Jones' reagent [J. Org. Chem., 21, 1547 (1956)] with stirring. After a 20 min. period 40 ml. of additional Jones' reagent is added and 30 min. later the mixture is diluted with methylene chloride. The organic layer is washed with dilute hydrochloric acid, water, dilute potassium bicarbonate solution, water and is then dried and concentrated. The residue thus obtained, is crystallized from methylene chloride-methanol to give 43 g. of 11-oxotestololactone (I), M.P., 237–241° C.

PREPARATION 2

6-dehydro-11α-hydroxytestololactone (I)

A mixture of 75 g. of 11α-hydroxytestololactone, 75 g. of recrystallized (dioxane) chloranil and 900 ml. of t-butyl alcohol is stirred under reflux for 50 minutes before being concentrated in vacuo. A chloroform solution of the residue thus obtained is washed with dilute potassium hydroxide solution, water and then dried and concentrated in vacuo. Trituration of the residue with acetone gives 29.15 g. of 6-dehydro-11α-hydroxytestololactone (I), M.P. 233–235° C. and 4.6 g. with M.P. 228–230° C. An analytical sample is recrystallized from acetone to give 6-dehydro-11α-hydroxytestololactone, M.P. 235.5–236.5°;

$$\lambda E_{max.}^{EtOH} \ 283 \ m\mu \ (\epsilon \ 26,700)$$

IR and NMR spectra are in agreement with the structure.
*Analysis.*—Calcd. for $C_{19}H_{24}O_4$ (percent): C, 72.12; H, 7.65. Found (percent): C, 72.19; H, 7.99.

PREPARATION 3

6-dehydro-11-ketotestololactone (I)

To a mixture of 32 g. of 6-dehydro-11α-hydroxytestololactone, 320 ml. of methylene chloride and 320 ml. of actone is added with stirring 26 ml. of Jones' reagent. After 20 minutes an additional 20 ml. of Jones' reagent is addes and the reaction mixture is stirred for about 15 minutes. The mixture is then shaken with 1 l. of chloroform and water. The organic layer is separated, washed with dilute hydrochloric acid, water, dilute potassium hydroxide solution, and then dried and concentrated in vacuo. Trituration of the residue thus obtained, with acetone gives 17.5 g. of 6-dehydro-11-ketotestololactone (I), M.P. 267–268° C. and 7.45 g. recrystallized from tetrahydrofuran with M.P. 263–264° C. An analytical sample crystallized from methylene chloridetetrahydrofuran gives 6-dehydro-11-ketotestololactone, M.P. 264–265° C.;

$$\lambda E_{max.}^{EtOH} \ 279 \ m\mu \ (\epsilon \ 25,000)$$

and IR and NMR spectra in agreement with the assigned structure.
*Analysis.*—Calcd. for $C_{19}H_{22}O_4$ (percent): C, 72.59; H, 7.05. Found (percent): C, 72.48; H, 7.14.

EXAMPLE 1

3,11-dioxo-13,17-secoandrosta-4,12-diene-17-oic acid (II)

A solution of 10.0 g. of 11-oxotestololactone in 600 ml. of methanol is treated with 5 ml. of 25% sodium methoxide in methanol at room temperature (about 25° C.), The sodium methoxide is added in 1 ml. increments at intervals of 30 minutes. Thirty minutes after the addition of the last portion of sodium methoxide, the reaction mixture is distilled in vacuo to a volume of 150 ml. The solution is then poured into 800 ml. of ice and water. The pH of the mixture is adjusted to approximately 8 by the addition of saturated sodium bicarbonate and the mixture is then extracted with methylene chloride (2× with 100 ml. portions). The aqueous phase is then acidified with cold dilute hydrochloric acid. The product is extracted with methylene chloride and dried over sodium sulfate. The dried extract is concentrated by distillation in vacuo and the residue thus obtained is crystallized from a mixture of methanol and ether to give 7.21 g. of 3,11-dioxo-13,17-secoandrosta-4,12-dien-17-oic acid (II), M.P. 159–162° C.; λ max. 232.5, ϵ 27,350/EtOH.

*Analysis.*—Calcd. for $C_{19}H_{24}O_4$ (percent): C, 71.90; H, 7.62. Found (percent): C, 72.18; H, 7.79.

EXAMPLE 2

3,11-dioxo-13,17-secoandrosta-4,12-dien-17-oic acid azide (III)

A solution of 3.17 g. of 3,11-dioxo-13,17-secoandrosta-4,12-dien-17-oic acid in 100 ml. of methanol is treated with a solution of 0.84 g. of sodium bicarbonate in 20 ml. of deionized water. The mixture is warmed a few minutes on a steam bath and the methanol is removed by distillation in vacuo. The aqueous residue is frozen solid in a Dry Ice acetate bath and placed on a lyopholyzer for freeze drying for about 20 hours. The product, 3,11-dioxo-13,17-secoandrosta-4,12-dien-17-oic acid, sodium salt, is used directly for the next step.

The 3,11-dioxo-3,17-secoandrosta-4,12-dien-17-oic acid, sodium salt from the previous step is suspended in 60 ml. of dry benzene (freshly dried by azeotropic distillation). Pyridine, 5 drops, is added and the mixture is cooled to about 10° C. Oxalyl chloride, 5.0 ml., is added slowly over a period of 5 minutes. The reaction mixture is protected at all times by a drying tube. After about 5 minutes of reaction time, the mixture is distilled in vacuo from a water bath kept at 15° C. or below. After the benzene is removed an additional 30 ml. of benzene is added and the mixture is again distilled in vacuo in the same manner to remove the last traces of excess oxalyl chloride. The residue is used directly for the next step. A strong C=O absorption at 1810 cm.$^{-1}$ in the infrared spectra (in methylene chloride solution) shows the material to be the desired 3,11-dioxo-13,17-secoandrosta-4,12-dien-17-oic acid chloride.

The acid chloride residue from the previous step is dissolved in 60 ml. of acetone and cooled to −10° C. A saturated solution of sodium azide, 5 ml., is added and the mixture is stirred for 90 minutes at −10° C. The mixture is then diluted with 60 ml. of water and the acid azide "oiled out," extracted with 100 ml. of benzene and dried over sodium sulfate. The dried extract is partially distilled (15 ml. removed) by distillation in vacuo from a water bath at 10°–15° C. to remove any last traces of water. An infrared spectra of the material shows it to be the desired 3,11-dioxo-13,17-secoandrosta-4,2-dien-17-oic acid azide, with a characteristic strong absorption at 2130 cm.$^{-1}$. The benzene solution of the acid azide is used directly in the following example.

EXAMPLE 3

*3,11-dioxo-13,16-secoandrosta-4,12-dienyl-16-isocyanate (IV)*

The benzene solution of the 3,11-dioxo-13,16-secoandrosta-4,12-dien-17-oic, acid azide from Example 2, above, is placed in a 500 ml. round bottom flask fitted with a water trap and reflux condenser. A drying tube at the top of the condenser led via stopcock and tubing to a water filled inverted cylinder in a bath in which to collect and measure the nitrogen evolved in this operation. The benzene solution is warmed on a steam bath and the majority of the nitrogen is evolved in 10 minutes. The mixture is refluxed for an additional 10 minutes to complete the reaction. Approximately 450 ml. of nitrogen is collected. The benzene solution is then concentrated by distillation in vacuo from a water bath at 30–40° C. to a volume of 20 ml. The residual 3,11-dioxo-13,16-secoandrosta - 4,12-dienyl-16-isocyanate (IV) thus obtained is used directly in the following example.

EXAMPLE 4

*3,11-dioxo-17-aza-13α-androst-4-ene (Va) and 3,11-dioxo-17-aza androst-4-ene (Va)*

The 3,11 - dioxo-13,16-secoandrosta-4,12-dienyl-16-isocyanate from Example 3, above, is taken up in 70 ml. of trifluoroacetic acid and 17.5 ml. of water. The mixture is warmed to 60–65° C. for 90 minutes. The reaction mixture is then distilled in vacuo from a water bath at 40° C. until a volume of approximately 40 ml. remains. The residue thus obtained is then diluted with 100 ml. of methanol, cooled to 5° C. and made alkaline, pH 10.5–11, by the addition of concentrated methanolic potassium hydroxide solution. The reaction mixture is kept at 5° C. until the reaction is complete and then distilled in vacuo from a water bath at about 25° C. until the volume is reduced to approximately 50 ml. The residue thus obtained is poured into 600 ml. of water, acidified with hydrochloric acid to pH 2 and saturated with sodium chloride. The 3,11-dioxo-17-aza 13ε-androst-4-ene hydrochloride, thus obtained, is extracted with three 50 ml. portions of methylene chloride. The methylene chloride extracts are combined and the 3,11 - dioxo-17-aza-13ε-androst-4-ene hydrochloride is extracted with three 100 ml. portions of deionized water. The aqueous solution of the amine hydrochloride is then made basic (pH 8–10) with 5% aqueous sodium hydroxide and the free amine thus obtained, is extracted with three 50 ml. portions of methylene chloride. The methylene chloride extracts are combined, dried over sodium sulfate and concentrated to dryness by distillation in vacuo to give 2.0 g. of 3,11-dioxo-17-aza-13ε-androst-4-ene, which is chromatographed on silica gel to give 3,11-dioxo-17-aza-13α-androst-4-ene and 3,11 - dioxo-17-aza-androst-4-ene, the 13α-isomer is the major product.

EXAMPLE 5

*17-aza-13α-pregn-4-ene-3,11,20-trione (Vc)*

A mixture of 2.0 g. 3,11-dioxo-17-aza-13ε-androst-4-ene, from Example 4, above, and 15 ml. of pyridine is acetylated with 7 ml. of acetic anhydride by warming the mixture on a steam bath for 5 minutes and allowing the mixture to stand at room temperature for about 2 hours. The mixture is then poured into ice and water and allowed to stand for 1 hour. The product is extracted with methylene chloride, dried over sodium sulfate, and concentrated to a light brown crystalline mass by distillation in vacuo. The crude product thus obtained is purified by redissolving the material in 50 ml. of methylene chloride and chromatographed over 160 g. of Florisil (magnesium silicate). The product is eluted with 50 ml. fractions of 30% acetone in Skellysolve B hexanes and recrystallized from ethyl acetate to give 1.0 g. of 17-aza-13α-pregn-4-ene-3,11,20-trione, M.P. 184–187° C.

$\lambda_{max.}^{EtOH}$ 236, ε 16,050

*Analysis.*—Calcd. for $C_{20}H_{27}NO_3$ (percent): C, 72.92; H, 8.26; N, 4.25. Found (percent): C, 72.37; H, 8.21; N, 4.57.

The corresponding 13β-isomer, 17-azapregn-4-ene-3,11,20-trione, is recovered from the liquors by additional chromatography.

EXAMPLE 6

*17-(methylsulfonyl)-17-aza-13α-androst-4-ene-3,11-dione (Vc)*

A solution of 4.8 g. of 17-aza-13ε-androst-4-ene-3,11-dione, in 50 ml. of methylene chloride is cooled to 5° C. and stirred at 5° C. for 30 minutes with 52 ml. of concentrated aqueous ammonia and 10 ml. of methane sulfonyl chloride. The methylene chloride layer is separated and dried over anhydrous sodium sulfate. The dried extract is concentrated by distillation in vacuo to a crystalline residue which is recrystallized from ethyl acetate to give 2.98 g. of 17-(methylsulfonyl)-17-aza-13α-androst-4-ene-3,11-dione (Vc), M.P. 201–203° C.

$\lambda_{max.}^{EtOH}$ 237, ε 15,850

*Analysis.*—Calcd. for $C_{19}H_{27}NSO_4$ (percent): C, 62.44; H, 7.45; N, 3.83; S, 8.77. Found (percent): C, 62.50; H, 7.45; N, 3.79; S, 8.65.

The corresponding 13β-isomer, 17-(methylsulfonyl)-17-azaandrost-4-ene-3,11-dione, is recovered from the filtrate by chromatography.

EXAMPLE 7

*3,11-dioxo-17-aza-13α-androst-4-en-17-carboxylic acid, methyl ester (Vc)*

A mixture of 3,11 - dioxo - 13,16 - secoandrosta - 4,12-dienyl-16-isocyanate, approximately 6.0 g., in 200 ml. of benzene is warmed with 150 ml. of methanol on a steam bath for 15 minutes and then allowed to stand at room temperature overnight. The mixture is concentrated to a volume of about 100 ml. and poured into 800 ml. of water. The product is extracted with methylene chloride, dried over sodium sulfate and concentrated to dryness by distillation in vacuo. The residue is dissolved in 50 ml. of methylene chloride and chromatographed over 400 g. synthetic magnesium silicate. The column is eluted with 60 ml. fractions of 30% acetone in Skellysolve B hexanes, to give 2.01 g. of 3,11-dioxo-13,16-secoandrosta-4,12-dienyl-16-amine, methylurethane as a pale yellow amorphous glass. NMR spectra exhibited 2 vinyl protons (4 and 12) at 5.75δ and 5.86δ respectively; CH₃O at 3.65δ; and methyl groups at 1.33δ and 1.96δ; infrared spectra showed strong absorption bands for C=O 1730 cm.⁻¹, conj. C=O 1675 cm.⁻¹, C=C 1665 cm.⁻¹ and open chain CONH at 1540 cm.⁻¹, thus supporting the structure.

A solution of 600 mg. of the glass thus obtained, is dissolved in 100 ml. of methanol is adjusted to pH 10–11 with methanolic potassium hydroxide and warmed to 65–75° C. for 2 hours while maintaining a nitrogen atmosphere over the reaction mixture. The solution is allowed to stand at room temperature overnight, concentrated to about 25 ml. by distillation in vacuo overnight, concentrated to about 25 ml. by distillation in vacuo from a water bath at 20° C., poured into saturated sodium chloride and extracted with methylene chloride. The extract is chromatographed over 40 g. of Florisil, (synthetic magnesium silicate). Elution with 25% and 30% acetone in Skellysolve B hexanes gives 188 mg. of crystals which are recrystallized from ethyl acetate-Skellysolve B hexanes to give 120 mg. of 3,11-dioxo-17-aza-13α-androst-4-ene-17-carboxylic acid, methyl ester, M.P. 167–169° C.

$\lambda_{max.}^{EtOH}$ 236

ε 14,800; NMR and IR spectra support the structure.

*Analysis.*—Calcd. for $C_{20}H_{37}NO_4$ (percent): C, 69.54; H, 7.58; N, 4.05. Found (percent): C, 68.78; H, 7.74; N, 4.24.

The corresponding 13β-isomer, 3,11-dioxo - 17 - azaandrost-4-ene-17-carboxylic acid, methyl ester, is recovered from the liquors by chromatography on Florisil.

EXAMPLE 8

*3,11-dioxo-13,17-secoandrosta-4,6,12-triene-17-oic acid (II)*

To a mixture of 14 g. of 6-dehydro-11-ketotestololactone and 500 ml. of methanol under a nitrogen atmosphere is added 10 ml. of 25% methanolic sodium methoxide. The mixture is stirred at room temperature for 16 hours when the pH of the solution is adjusted to 7 with a few drops of concentrated hydrochloric acid. The solution is then concentrated in vacuo and the residue obtained is dissolved in water. The aqueous solution is acidified to pH 1 and extracted with chloroform. The organic extract is washed with water, dried and concentrated in vacuo to give 14 g. of the 3,11-dioxo-13,17-secoandrosta-4,6,12-triene-17-oic acid (II) as an oil.

EXAMPLE 9

*3,11-dioxo-13,17-secoandrosta-4,6,12-triene-17-oic acid azide (III)*

To a mixture of 14 g. (0.0446 mole) of 3,11-dioxo-13,17-secoandrosta-4,6,12-triene-17-oic acid, 250 ml. of acetone, 20 ml. of water and 4.8 g. (0.048 mole) of triethylamine at 0–5° C. is added with stirring 6.56 g. (0.048 mole) of iso-butyl chloroformate. The mixture is stirred for about 0° C. for 30 minutes when a cold solution of 14 g. of sodium azide in 70 ml. of water is added. One hour later the mixture is diluted with water and extracted with methylene chloride. The organic layer is washed with cold water, dilute potassium bicarbonate solution, water, saturated sodium chloride solution and is then dried and concentrated in vacuo below 30° to give 3,11-dioxo-13,17-secoandrosta-4,6,12-triene-17-oic acid azide.

EXAMPLE 10

*3,11-dioxo-13,17-secoandrosta-4,6,12-trienyl-16-isocyanate (IV)*

A solution of the 3,11-dioxo-13,17-secoandrosta-4,6,12-triene-17-oic acid azide from Example 9, above, in 800 ml. of benzene is concentrated in vacuo to about 500 ml. (to remove traces of water) and the mixture is then refluxed for 1.5 hour before being concentrated further in vacuo to give 3,11-dioxo-13,17-secoandrosta-4,6,12-trien-16-isocyanate (IV);

$$\nu_{max.}^{CH_2Cl_2}\ 2280\ cm.^{-1}$$

EXAMPLE 11

*3,11-dioxo-17-aza-13α-androst-4,6-diene (Va) and 3,11-dioxo-17-azandrost-4,6-diene (Va)*

A mixture of the 3,11-dioxo-13,17-secoandrosta-4,6,12-trienyl-16-isocyanate, from Example 10, above, (ca. 14 g.), 150 ml. of glacial acetic acid, 50 ml. of water and 1 drop of triethylamine is heated at 60° under a nitrogen atmosphere for 2 hours. The mixture is concentrated in vacuo and the residue is shaken with methylene chloride and dilute potassium hydroxide solution. The organic layer is washed with water, dried and concentrated in vacuo. The residue thus obtained is dissolved in methanol under nitrogen, allowed to stand for about 16 hours at room temperature, about 25° C., and then concentrated in vacuo to give 3,11-dioxo-17 aza-13α-androst-4,6-diene (Va) and 3,11-dioxo-17-azaandrost-4,6-diene (Va), which are separated by chromatography on Florisil or used directly in subsequent preparations.

EXAMPLE 12

*17 - (methylsulfonyl)-17-aza-13α-androsta-4,6-diene-3,11-dione (Vc) and 17-(methylsulfonyl)-17-azaandrosta-4,6-diene-3,11-dione (Vc)*

To a mixture of 11 g. of 3,11-dioxo-17-aza-13ε-androst-4,6-diene, from Example 11, above, 150 ml. of methylene chloride, 50 ml. of water and 100 ml. of concentrated ammonium hydroxide at 0–5° C. is added dropwise with stirring 30 ml. of methanesulfonyl chloride at such a rate as to maintain a reaction temperature below 15°. Ten minutes after the addition, more methylene chloride is added and the organic layer is washed with dilute potassium hydroxide solution, water and then dried and concentrated in vacuo to give 12 g. of a residue containing sulfonamides. The crude product is chromatographed on a column prepared by wet packing 2 kg. of silica gel with 4 l. of 10% methanol in chloroform. Elution of the column with 3–6% methanol in chloroform gives three principal bands of material. The material from the first band is crystallized from ethyl acetate to give 3.6 g. of 17-(methylsulfonyl) - 17 - aza-13α-androsta - 4,6-diene-3,11-dione, M.P. 176–177° C., and 1.9 g. of a second crop of the same product, M.P. 175–176° C. An analytical sample of 17-(methylsulfonyl)-17-aza-13α-androsta - 4,6 - diene-3,11-dione (Vc) had M.P. 176–177° C., $$\lambda_{max.}^{EtOH}\ 280\ m\mu\ (\epsilon\ 26,050)$$

and IR, NMR and mass spectra in agreement with the structure.

*Analysis.*—Calcd. for $C_{19}H_{25}NO_4S$ (percent): C, 62.78; H, 6.93; S, 8.82. Found (percent): C, 62.53; H, 6.46; S, 8.69.

The material from the second band is triturated with ethyl acetate to give 0.41 g. (2.5%) of 17-(methylsulfonyl) - 17 - azaandrosta-4,6-diene-3,11-dione, M.P. 209–211° C. An analytical sample of the 17-(methylsulfonyl)-17-azaandrosta - 4,6 - diene-3,11-dione is crystallized from methylene chloride-ethyl acetate, M.P. 210–211.5° C.;

$$\lambda_{max.}^{EtOH}\ 281\ m\mu\ (\epsilon\ 26,250)$$

and IR, NMR and mass spectra in agreement with the structure.

*Analysis.*—Calcd. for $C_{19}H_{25}NO_4S$ (percent): C, 62.78; H, 6.93. Found (percent): C, 62.79; H, 7.07.

The material from the third band is triturated with ethyl acetate to give 1.1 g. (7.5%) of product, M.P. 154–156° C.; an analytical sample of the N-acetyl-3,11-dioxo-13,16-secoandrosta-4,6,12-trien-16-ylamine thus obtained is crystallized from methylene chloride-ethyl acetate, M.P. 158–159° C.;

$$\lambda_{max.}^{EtOH}\ 239\ m\mu\ (\epsilon\ 16,500)$$

and 280 mμ (ϵ 24,700) and IR, NMR and mass spectra in agreement with the structure.

*Analysis.*—Calcd. for $C_{20}H_{25}NO_3$ (percent): C, 73.36; H, 7.70; N, 4.28. Found (percent): C, 73.48; H, 7.79; N, 4.41.

EXAMPLE 13

*3,11-dioxo-17-aza-13-androsta-4,6-diene-17-carboxylic acid, methyl ester (Vc)*

To a solution of 28 g. of 6-dehydro-11-ketotestololactone, 200 ml. of methylene chloride and 400 ml. of methanol under nitrogen is added with stirring 20 ml. of 25% methanolic sodium methoxide. The mixture is stirred at room temperature for 1 hour adjusted to pH 7 and the product recovered in the manner described in Example 8, above, to give 28 g. of 3,11-dioxo-13,17-secoandrosta-4,6,12-trien-17-oic acid, which is converted to 3,11-dioxo-13,17-secoandrosta-4,6,12-trienyl-16-isocyanate in accordance with the procedure of Examples 9 and 10, above. The isocyanate thus obtained is dissolved in 300 ml. of acetic acid, 90 ml. of water and 8 ml. of concentrated hydrochloric acid. The mixture is allowed to stand at room temperature for 16 hours and at 60° for 1 hour before being concentrated in vacuo. The residue is stirred with ether-methylene chloride (2:1) and dilute potassium hydroxide solution under nitrogen for 2 hours. The organic layer is washed with water then concentrated in vacuo to give 3,11-dioxo-17-aza-13ε-androst-4,6-diene.

To a stirred mixture of the 3,11-dioxo-17-aza-13ε-androst-4,6-diene thus obtained 300 ml. of methylene chloride and 150 ml. of water is added alternatively small portions of 35 ml. of methyl chloroformate and dilute potassium hydroxide solution so as to maintain the pH of the aqueous layer at 10–12. Five minutes after the last chloroformate addition, the organic layer is separated and washed with cold dilute ammonium hydroxide solution, water and then dried and concentrated in vacuo. The residue thus obtained (28 g.) is chromatographed on a column prepared by wet packing 3 kg. of silica gel with about 6 l. of 10% methanol in chloroform. Elution with 3% methanol in chloroform gives one main band of material which is recrystallized from ethyl acetate-hexanes to give 11.45 g. of 3,11-dioxo-17-aza-13α-androsta-4,6,-diene-17-carboxylic acid, methyl ester (Vc), M.P. 145–149° C. and 8.15 g. with M.P. 151–154°. An analytical sample of the 3,11-dioxo-17-aza-13α-androsta-4,6-diene-17-carboxylic acid, methyl ester (Vc), is crystallized from acetonitrile as a 1:1-mole solvate and has a vac. M.P. of 138° C., resolidifying and remelting at 178–179° C., $$\lambda_{max.}^{EtOH} \ 279 \ m\mu \ (\epsilon \ 23{,}650)$$

IR, NMR and mass spectra are in agreement with the structure.

Analysis.—Calcd. for $C_{20}H_{25}NO_4$ (percent): C, 69.95; H, 7.33. Found (percent): C, 70.07; H, 7.39.

The corresponding 13β-isomer, 3,11-dioxo-17-azaandrosta-4,6-diene-17-carboxylic acid, methyl ester (Vc) is recovered from the mother liquor by additional chromatography.

EXAMPLE 14

*3,11-dioxo-17-aza-13α-androst-4-ene-17-carboxylic acid, methyl ester (Vc)*

Following the procedure of Example 13 above, 28 g. of 11-oxotestololactone is converted to 23.8 g. of 3,11-dioxo-17-aza-13α-androst-4-ene-17-carboxylic acid, methyl ester, M.P. 165–167° C.; an analytical sample melted at 167–168° C.;

$$\lambda_{max.}^{EtOH} \ 237 \ m\mu \ (\epsilon \ 16{,}050)$$

NMR, IR and mass spectra are consistent with the structure.

Analysis.—Calcd. for $C_{20}H_{27}NO_4$ (percent): C, 69.54; H, 7.88; N, 4.06. Found (percent): C, 69.68; H, 7.77; N, 4.20.

The corresponding 13β-isomer, 3,11-dioxo-17-azaandrost-4-ene-17-carboxylic acid methyl ester (Vc) is recovered by chromatography.

EXAMPLE 15

*11 - hydroxy - 3 - oxo-17-aza-13 -androsta-4,6-diene-17-carboxylic acid, methyl ester (Vd) and 11α-hydroxy-3 - oxo - 17 - aza - 13α-androsta-4,6-diene-17-carboxylic acid, methyl ester (Vd)*

To a mixture of 6.5 g. of 3,11-dioxo-17-aza-13α-androsta-4,6-diene-17-carboxylic acid, methyl ester, 65 ml. of methylene chloride and 65 ml. of absolute ethanol is added with stirring a solution of 2 g. of sodium borohydride in 8 ml. of water and 40 ml. of absolute ethanol. The mixture is stirred overnight, then ice chips and dilute acetic acid are added to destroy the excess reducing agent. The product is extracted with chloroform and the organic layer is washed with dilute hydrochloric acid, dilute potassium hydroxide solution, water, and then dried and concentrated in vacuo. The residue of diols thus obtained, in 325 ml. of chloroform is stirred with 32.5 g. of activated manganese dioxide at room temperature for about 16 hr., after which time, 65 ml. of absolute ethanol is added and the mixture is filtered through a pad of Celite. The filtrate is concentrated in vacuo and the residue is chromatographed on a column prepared by wet packing 2 kg. of silica gel with 4 l. of 10% methanol in chloroform. Elution of the column with 2.5–3.5% methanol in chloroform gives from the first band, material which is recrystallized from ethyl acetate—Skellysolve B to give 3.05 g. of 11β-hydroxy-3-oxo-17-aza-13α-androsta-4,6-diene-17-carboxylic acid, methyl ester, M.P. 162–163° C. and 0.68 g. second crop, M.P. 160–162° C.; an analytical sample melted at 163.5–164.5° C.;

$$\lambda_{max.}^{EtOH} \ 283 \ m\mu \ (\epsilon \ 26{,}250)$$

and had infrared and mass spectra in agreement with the structure.

Analysis.—Calcd. for $C_{20}H_{27}NO_4$ (percent): C, 69.54; H, 7.88; N, 4.06. Found (percent): C, 69.51; H, 7.82; N, 4.13.

The second band gave material (1.35 g.) which is recrystallized from ethyl acetate to give 105 g. of 11α-hydroxy - 3 - oxo - 17 - aza - 13α - androsta - 4,6 - diene-17-carboxylic acid, methyl ester, M.P. 208–213° C.; an analytical sample is crystallized from methylene chloride-ethyl acetate, M.P. 215–217° C.;

$$\lambda_{max.}^{EtOH} \ 282 \ m\mu \ (\epsilon \ 24{,}950)$$

infrared and mass spectra are in agreement with the structure.

Analysis.—Calcd. for $C_{20}H_{27}NO_4$ (percent): C, 69.54; H, 7.88; N, 4.06. Found (percent): C, 69.29; H, 7.72; N, 3.98.

In the same manner substituting the corresponding 13β - isomer - 3,11 - dioxo - 17 - azaandrosta - 4,6 - diene-17-carboxylic acid, methyl ester as starting material, there is obtained 11β-hydroxy-3-oxo-17α-azaandrosta-4,6-diene-17-carboxylic acid, methyl ester (Vd) and 11α-hydroxy-3-oxo-17-azaandrosta-4,6-diene-17-carboxylic acid, methyl ester (Vd)

EXAMPLE 16

*11β - hydroxy - 3 - oxo - 17 - aza - 13α - androst - 4 - ene-17 - carboxylic acid, methyl ester (Vd) and 11α - hydroxy - 3 - oxo - 17 - aza - 13α - androst - 4 - ene - 17-carboxylic acid, methyl ester (Vd)*

Following the procedure of Example 15, above, a solution of 5 g. of sodium borohydride in 20 ml. of water and 100 ml. of absolute ethanol is added with stirring to a solution of 15 g. of 3,11-dioxo-17-aza-13α-androst-4-ene-17-carboxylic acid, methyl ester, 150 ml. of methylene chloride and 150 ml. of absolute ethanol. The isolated mixture of diols in 750 ml. of chloroform is oxidized with 75 g. of manganese dioxide and the crude product obtained is chromatographed on a column prepared by wet packing 3 kg. of silica gel with 6 l. of 8% methanol in chloroform. Elution of the column with 2.5–3.5% methanol in chloroform gives two principal bands. Trituration of material from the first band gives 6.85 g. (46%) of 11β-hydroxy-3-oxo-17-aza-13α-androst-4-ene-17-carboxylic acid, methyl ester, M.P. 227–229° C.; an analytical sample is crystallized from acetonitrile, M.P. 228–230° C.;

$$\lambda_{max.}^{EtOH} \ 240.5 \ m\mu \ (\epsilon \ 16{,}350)$$

NMR, IR and mass spectra are in agreement with the structure.

Analysis.—Calcd. for $C_{20}H_{29}NO_4$ (percent): C, 69.13; H, 8.41; N, 4.03. Found (percent): C, 69.25; H, 8.42; N, 4.15.

Material from the second band is crystallized from acetonitrile and gives 2.1 g. (14%) of 11α-hydroxy-3-oxo-17-aza-13α androst-4-ene-17-carboxylic acid, methyl ester, M.P. 203–204.5° C.; an analytical sample melts at 204–205° C., $\lambda_{max.}^{EtOH}$ 240.5 m$\mu$ ($\epsilon$ 16,300)

NMR, IR and mass spectra are in agreement with the structure.

*Analysis.*—Calcd. for $C_{20}H_{29}NO_4$ (percent): C, 69.13; H, 8.41; N, 4.03. Found (percent): C, 69.07; H, 8.49; N, 4.13.

In the same manner substituting the corresponding 13$\beta$-isomer, 3,11 - dioxo - 17-azaandrost-4-ene-17-carboxylic acid, methyl ester as starting material, there is obtained 11$\beta$ - hydroxy - 3-oxo-17-azaandrost-4-ene-17-carboxylic acid (Vd) and 11$\alpha$-hydroxy-3-oxo-17-azaandrost-4-ene-17-carboxylic acid, methyl ester (Vd).

EXAMPLE 17

*11$\beta$-hydroxy-17-methyl-17-aza-13$\alpha$-androst-4-ene-3-one (Vh) via an enol ether protecting group*

A mixture of 10 g. of 3,11-dioxo-17-aza-13$\alpha$-androst-4-ene-17-carboxylic acid, methyl ester, 50 ml. of dimethylformamide, 50 ml. of 2,2-dimethoxypropane, 2 ml. of methanol and 250 mg. of p-toluenesulfonic acid is refluxed with stirring under a nitrogen atmosphere for about 4 hr. The mixture is cooled, 1.5 g. of sodium bicarbonate powder is added followed by methylene chloride and ether (solvent ratio 1:2). The organic solution is washed with sodium bicarbonate solution, water and saturated salt solution and is then dried and concentrated in vacuo. The enol ether residue is dissolved in 100 ml. of dry xylenes and the resulting solution is concentrated in vacuo.

The enol ether residue thus obtained in 100 ml. of dry benzene is added with stirring to a mixture of 4 g. of lithium aluminum hydride and 350 ml. of tetrahydrofuran under nitrogen. The mixture is refluxed for 20 hr. then cooled in an ice bath while a solution of 15 ml. of water in 50 ml. of tetrahydrofuran is added cautiously. The mixture is concentrated in vacuo to a paste. Dilute sodium hydroxide solution is added to the residue and the organic material is extracted with methylene chloride. The organic extract is washed with water then concentrated in vacuo. The residue thus obtained in 100 ml. of tetrahydrofuran is treated with a solution of 20 ml. of concentrated hydrochloric acid and 20 ml. of water for about 1 hr. at room temperature. The mixture is made basic with sodium hydroxide solution and the product is extracted with methylene chloride. The organic layer is washed with water, dried and concentrated. Crystallization of the residue from ether gives 1.5 g. of 11$\beta$-hydroxy-17-methyl-17-aza-13$\alpha$-androst-4-en-3-one, M.P. 150–151° C., and a residue (6 g.) which was chromatographed on a column prepared by wet packing 600 g. of silica gel with 200 ml. of ethyl acetate and 24 ml. of triethylamine. Elution of the column with 1% triethylamine in ethyl acetate gives material which on recrystallization from ether gives 4.1 g. of 11$\beta$-hydroxy-17-methyl-17-aza-13$\alpha$-androst-4-en-3 - one, M.P. 148–151° C. Analytically pure 11$\beta$-hydroxy-17-methyl-17-aza-13$\alpha$-androst-4-en-3-one melted at 149–150° C.

$\lambda_{max.}^{EtOH}$ 240.5 m$\mu$ ($\epsilon$ 16,050)

NMR, IR and mass spectra are consistent for the structure.

*Analysis.*—Calcd. for $C_{19}H_{29}NO_2$ (percent): C, 75.20; H, 9.63; N, 4.62. Found (percent): C, 74.98; H, 9.73; N, 4.89.

In the same manner substituting the corresponding 13$\beta$-isomer, 3,11-dioxo-17-azaandrost-4-ene-17-carboxylic acid methyl ester, as starting material, there is obtained, 11$\beta$-hydroxy-17-methyl-17-azaandrost-4-en-3-one (Vh).

EXAMPLE 18

*11$\beta$-hydroxy-17-methyl-17aza-13$\alpha$-androst-4-en-3-one (Vh) via an enamine protecting group*

To a mixture of 5 g. of 3,11-dioxo-17-aza-13$\alpha$-androst-4-ene-17-carboxylic acid, methyl ester and 20 ml. of anhydrous methanol at 55° C. under nitrogen is added with swirling 2.5 ml. of pyrrolidine. The mixture is heated at about 60° C. for about 4 min. then cooled. The product is collected and washed with methanol (—15° C.) to give 4.8 g. of the 3-pyrrolidyl enamine of 3,11-dioxo-17-aza-13$\alpha$-androst-4-ene-17-carboxylic acid, methyl ester, M.P. 191° C. dec., having a suitable IR spectrum.

The anamine thus obtained (4.8 g.) in 50 ml. of benzene is added with stirring to a mixture of 2.0 g. of lithium aluminum hydride and 170 ml. of tetrahydrofuran under nitrogen. The mixture is refluxed for about 5 hr. then cooled in an ice bath and a solution of 15 ml. of water in 50 ml. of tetrahydrofuran is added cautiously. The mixture is concentrated in vacuo to a paste and to the paste is added a solution of 120 ml. of methanol and 25 ml. of glacial acetic acid. The resulting mixture is heated at about 50° C. for 15 min., then cooled and a solution of 30 g. of sodium hydroxide in 150 ml. of water is added. The mixture is stirred at 30–35° C. for 15 min. and most of the methanol is then removed in vacuo. The mixture is extracted with methylene chloride-ether (1:2) and the organic extract is washed with dilute potassium hydroxide solution and saturated salt solution. Concentration of the dried organic layer in vacuo gives a residue which is crystallized from ether to give 0.37 g. of 11$\beta$-hydroxy-17-methyl-17-aza-13$\alpha$-androst-4-en-3-one, M.P. 145–148° C. and 0.05 g. with M.P. 139–147° C.; the product is identical with that prepared via the 3-methyl enol ether route of Example 17, above.

In the same manner starting with the corresponding 13$\beta$-isomer, 11$\beta$-hydroxy-17-methyl-17-azaandrost-4-en-3-one is obtained.

EXAMPLE 19

*11$\beta$-hydroxy-3-oxo-17-aza-13$\alpha$-androst-4-ene-17 carboxylic acid, $\delta$-lactone (X)*

A mixture of 3 g. of 11$\beta$-hydroxy-3-oxo-17-aza-13$\alpha$-androst-4-ene-17-carboxylic acid, methyl ester, 50 ml. of anhydrous methanol and 5 ml. of 25% methanolic sodium methoxide is refluxed for about 16 hr. under a nitrogen atmosphere. The mixture is cooled, shaken with water and chloroform and the organic layer is washed with water, dried and concentrated. The crude product is chromatographed on 1 kg. of silica gel wet packed with 50% acetone in Skellysolve B. Elution of the column with 50–67% acetone in Skellysolve B gave two bands of material.

Material from the first band is crystallized from acetonitrile giving 0.85 g., M.P. 228–230° C. and proved to be unchanged starting material. Crystallization of material from the second band from acetonitrile gives 1.5 g. of the 11$\beta$ - hydroxy - 3 - oxo - 17-aza-13$\alpha$-androst-4-ene-17-carboxylic acid, $\delta$-lactone (X), M.P. 233–234.5° C.; an analytical sample melted at 233–234.5° C.;

$\lambda_{max.}^{EtOH}$ 238 m$\mu$ ($\epsilon$ 17,000)

NMR, IR and mass spectra are in agreement with the structure.

*Analysis.*—Calcd. for $C_{19}H_{25}NO_3$ (percent): C, 72.35; H, 7.99; N, 4.44. Found (percent): C, 72.21; H, 7.90; N, 4.72.

EXAMPLE 20

*11$\beta$-hydroxy-17-aza-13$\alpha$-androst-4-en-3-one, hydrochloride (V)*

A mixture of 4.5 g. of 11$\beta$-hydroxy-3-oxo-17-aza-13-$\alpha$-androst-4-ene-17-carboxylic acid, methyl ester, 110 ml. of methanol and 22 ml. of 45% potassium hydroxide solution is refluxed with stirring under a nitrogen atmosphere for 20 hr. The mixture is cooled and shaken with water and methylene chloride and the organic layer is washed with saturated salt solution, dried and concentrated. The crystalline residue of 11$\beta$-hydroxy-17-aza-13$\alpha$-androst-4-ene-3-one is dissolved in methylene chloride-ether (1:2) and ethereal hydrogen chloride is added with stirring. The precipitate is collected and washed with ether to give 4.35 g. of 11$\beta$-hydroxy-17-aza-13$\alpha$-androst-4-en-3-one, hydrochloride (V), M.P. 265–267° C. (dec.); an analytical sample is precipitated from a methylen chloride-acetonitrile solution using ether, M.P. 268° C. (dec.);

$$\lambda_{max.}^{EtOH} \ 239 \ m\mu \ (\epsilon \ 15{,}500)$$

NMR and IR spectra support the structure and indicate that there is water of hydration present in the product.

*Analysis.*—Calcd. for $C_{18}H_{28}ClNO_2 \cdot \frac{1}{2}H_2O$ (percent): C, 64.55; H, 8.73; Cl, 10.59. Found (percent): C, 64.48; H, 8.95; Cl, 10.81.

We claim:

1. A member selected from the group consisting of compounds of the formula:

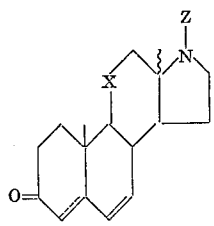

wherein X is carbonyl, α-hydroxymethylene or β-hydroxymethylene; Z is hydrogen, an alkyl radical of from 1 to 8 carbon atoms, inclusive, —SO$_2$R, —COR$_1$ or —COOR$_1$, in which R is an alkyl radical as defined above phenyl, tolyl, xylyl, naphthyl, diphenyl, halophenyl or nitrophenyl and R$_1$ is an alkyl radical as defined above; and the broken line between the 6- and 7- carbon atoms in the structural formula indicates a single bond linkage or a double bond linkage; and the acid addition salts of the compounds of the above structural formula wherein Z is hydrogen or an alkyl radical as defined above.

2. A member selected from the group consisting of compounds of the formula:

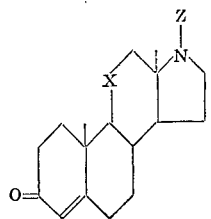

wherein X is carbonyl, α-hydroxymethylene or β-hydroxymethylene; and Z is hydrogen, an alkyl radical of 1 to 8 carbon atoms, inclusive, —SO$_2$R, —COR$_1$ or —COOR$_1$, in which R is an alkyl radical as defined above, phenyl, tolyl, xylyl, naphthyl, diphenyl, halophenyl or nitrophenyl and R$_1$ is an alkyl radical as defined, above, and the acid addition salts of the compounds of the above structural formula, wherein Z is hydrogen or an alkyl radical.

3. 3,11 - dioxo - 17 - aza - 13α - androst - 4 - ene, the compound of claim 2, wherein X is carbonyl and Z is hydrogen.

4. 17 - aza - 13α - pregn - 4 - ene - 3,11,20 - trione, the compound of claim 2 in which X is carbonyl and Z is —COR$_1$ in which R$_1$ is methyl.

5. 17 - (methylsulfonyl) - 17 - aza - 13α - androst-4-en-3,11-dione, the compound of claim 2, in which X is carbonyl and Z is —SO$_2$R in which R is methyl.

6. 3,11 - dioxo - 17 - aza - 13α - androst - 4 - en - 17-carboxylic acid, methyl ester, the compound of claim 2, wherein X is carbonyl and Z is —COOR$_1$, in which R$_1$ is methyl.

7. 11β - hydroxy - 3 - oxo - 17 - aza - 13α - andorst-4-ene-17-carboxylic acid, methyl ester, the compound of claim 2 wherein X is β - hydroxymethylene and Z is —COOR$_1$, in which R$_1$ is methyl.

8. 11α - hydroxy - 3 - oxo - 17 - aza - 13α - androst-4-ene-17-carboxylic acid, methyl ester, the compound of claim 2, wherein X is α - hydroxymethylene and Z is —COOR$_1$, in which R$_1$ is methyl.

9. 11β - hydroxy - 17 - methyl - 17 - aza - 13α - androst-4-en-3-one, the compound of claim 2, wherein X is β-hydroxymethylene and Z is methyl.

10. 11β - hydroxy - 17 - aza - 13α - androst-4-en-3-one, hydrochloride, the compound of claim 2, wherein X is β - hydroxymethylene, Z is hydrogen and the pharmacologically acceptable acid addition salt is the hydrochloride.

11. A member selected from the group consisting of compounds of the formula:

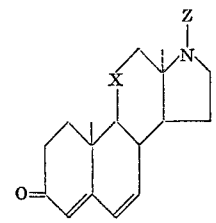

wherein X is carbonyl, α-hydroxymethylene or β-hydroxymethylene; and Z is hydrogen, an alkyl radical of 1 to 8 carbon atoms, inclusive, —SO$_2$R, —COR$_1$ or —COOR$_1$, in which R is an alkyl radical as defined above, phenyl, tolyl, xylyl, naphthyl, diphenyl, halophenyl or nitrophenyl and R$_1$ is an alkyl radical as defined above, and the acid addition salts of the compounds of the above structural formula wherein Z is hydrogen or an alkyl radical.

12. 3,11 - dioxo - 17 - aza - 13α - androst - 4,6 - diene, the compound of claim 11, wherein X is carbonyl and Z is hydrogen.

13. 17 - methylsulfonyl - 17 - aza - 13α - androsta-4,6-dien-3,11-dione, the compound of claim 11, wherein X is carbonyl and Z is —SO$_2$R, in which R is methyl.

14. 3,11 - dioxo - 17 - aza - 13α - androst - 4,6 - diene-17-carboxylic acid, methyl ester, the compound of claim 11, wherein X is carbonyl and Z is —COOR$_1$, in which R$_1$ is methyl.

15. 11β - hydroxy - 3 - oxo - 17 - aza - 13α - androsta-4,6-diene-17-carboxylic acid, methyl ester, the compound of claim 11, wherein X is β-hydroxymethylene and Z is —COOR$_1$, in which R$_1$ is methyl.

16. 11α - hydroxy - 3 - oxo - 17 - aza - 13α - androsta-4,6-diene-17-carboxylic acid, methyl ester, the compound of claim 11, wherein X is α - hydroxymethylene and Z is —COOR$_1$ in which R$_1$ is methyl.

17. 17 - (methylsulfonyl) - 17 - azaandrosta-4,6-diene-3,11-dione.

18. A compound of the formula:

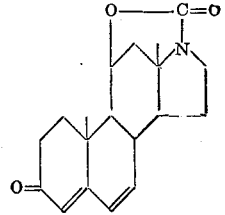

References Cited

Rakhit et al., Tetrahedron Letters 1964 (3–4), 223–5.
Rakhit et al., Steroids 9 (2), 135–41 (1967).

HENRY R. JILES, Primary Examiner
G. T. TODD, Assistant Examiner

U.S. Cl. X.R.

260—326.3, 326.5 B, 326 SF, 343.2 S, 453 A, 468.5, 514.5, 563 A; 424—274

UNITED STATES PATENT OFFICE
CERTIFICATE OF CORRECTION

Patent No. 3,634,419                Dated January 11, 1972

Inventor(s) Norman A. Nelson, and Robert W. Jackson

It is certified that error appears in the above-identified patent and that said Letters Patent are hereby corrected as shown below:

Column 17, line 23, for

" 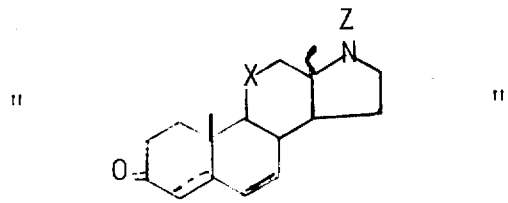 "

read

-- 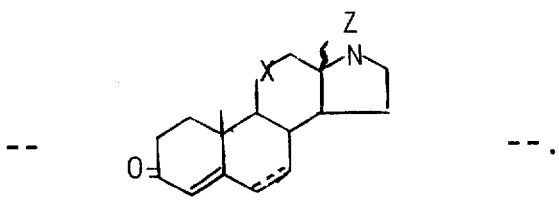 --.

Column 18, line 61, for

" 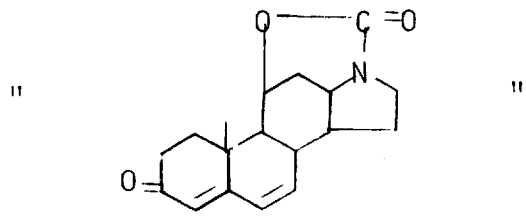 "

UNITED STATES PATENT OFFICE
CERTIFICATE OF CORRECTION

PAGE-2

Patent No. 3,634,419                    Dated January 11, 1972

Inventor(s) Norman A. Nelson, and Robert W. Jackson

It is certified that error appears in the above-identified patent and that said Letters Patent are hereby corrected as shown below:

read

-- 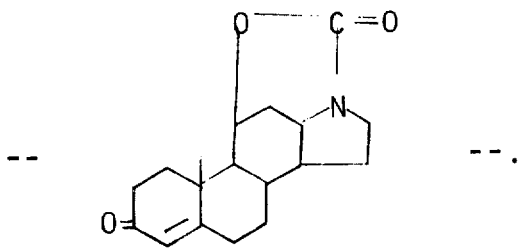 --.

Signed and sealed this 4th day of July 1972.

(SEAL)
Attest:

EDWARD M. FLETCHER, JR.                ROBERT GOTTSCHALK
Attesting Officer                      Commissioner of Patents